United States Patent [19]
Yokote et al.

[11] Patent Number: 6,067,108
[45] Date of Patent: May 23, 2000

[54] SOLID-STATE MASS STORAGE DATA STREAM GENERATOR

[75] Inventors: Timothy A. Yokote, Torrance; Dirk K. Brandis, Novato; Thomas J. Gritzmacher, Torrance, all of Calif.

[73] Assignee: TRW Inc., Redondo Beach, Calif.

[21] Appl. No.: 08/764,472

[22] Filed: Dec. 12, 1996

[51] Int. Cl.$^7$ .................................................. H04N 7/10
[52] U.S. Cl. ........................ 348/7; 711/104; 395/200.47
[58] Field of Search .................................. 348/7, 12, 13, 348/714–718; 711/104, 105, 111–114; 395/200.47, 200.48

[56] References Cited

U.S. PATENT DOCUMENTS

| | | | |
|---|---|---|---|
| 5,133,079 | 7/1992 | Ballantyne et al. | 348/7 |
| 5,553,005 | 9/1996 | Voeten et al. | 364/514 R |
| 5,651,129 | 7/1997 | Yokote et al. | 395/431 |
| 5,721,878 | 2/1998 | Ottesen et al. | 348/7 |

*Primary Examiner*—Victor R. Kostak
*Attorney, Agent, or Firm*—Michael S. Yatsko; Robert W. Keller

[57] ABSTRACT

Apparatus, and a related method for its operation, for generating multiple parallel streams of data from a large solid-state mass storage device, under the individual control of multiple users requesting the data streams. The apparatus includes a hardware interface table containing a user command and current memory address for each active user requesting data from storage. Memory array addressing logic cycles through the hardware interface table and generates multiple streams of memory array addresses based on the user commands and the current memory addresses, but without using a processor to generate the addresses. The address streams are directed to a memory array, from which are output multiple streams of corresponding data. User commands for selective control of each data stream are converted to new memory addresses, which are stored in the hardware interface table and almost instantly result in performance of requested control functions with respect to the data streams.

8 Claims, 4 Drawing Sheets

SOLID-STATE MASS STORAGE DATA STREAM GENERATOR

BACKGROUND OF THE INVENTION

This invention relates generally to systems for retrieving large volumes of digital data on demand and, more particularly to solid state mass storage devices for storing and retrieving data for interactive applications, such as video-on-demand applications. There is a growing need for solid state mass storage devices to support highly interactive multimedia applications, such as video on demand for cable television operation, interactive learning for schools and businesses, and data service for business and financial use. Different interactive application types require servers having different characteristics to retrieve and generate the appropriate data streams. For example, small servers can be used to handle business or educational applications with up to a few hundred users requesting data. Large, centrally located servers with large storage capacities may be needed to handle the needs of systems serving thousands of servers simultaneously.

All data servers have in common a hierarchy of memory storage media, and an output interface to a standard information delivery system, sometimes referred to as an information highway. Applications having a small number of users and requiring little interaction between the user and the information can be served with inexpensive storage media, such as optical or magnetic disks. As the number of users increases, the need for higher performance media also increases. In general, the servers should employ storage media optimized for each particular use and for user requirements. Thus the media may include digital tape, optical disks, magnetic disks, redundant arrays of inexpensive disks (RAID), and solid state memories. The present invention pertains specifically to data servers using solid state memory as the storage medium.

Prior to this invention, data storage systems available or proposed for highly interactive multimedia applications, such as video on demand, interactive learning and data services, have employed adaptations of existing computer technology, including magnetic disk drives, redundant arrays of inexpensive disks (RAID), optical disks and magnetic tape drives. Typically, servers prior to the present invention have a capability of providing one to two hundred streams of data to separate users. A desirable goal is to generate as many as two thousand data streams simultaneously.

More specifically, there is a need for a solid state memory to provide high output speed, which is needed to service large numbers of users simultaneously; rapid access, for highly interactive operation; the ability to output in a standard data transfer format without the need for an external processor; the ability to receive inputs from other storage devices over standard high speed interconnects; and a modular structure to facilitate expansion as needed. The present invention satisfies and exceeds these requirements.

SUMMARY OF THE INVENTION

The present invention resides in a data stream generator capable of providing a large number of controllable parallel streams of data. In general terms, the system of the invention comprises a server for receiving and processing data requests from multiple users; a large solid state addressable memory array, for storing data for retrieval by multiple separate users; a hardware interface table defining selectable user status, user command and current memory address information for each user accessing the memory array; memory array addressing logic, for generating a stream of memory addresses based on information stored in the hardware interface table, wherein the stream of memory addresses results in generation of a corresponding stream of data from the memory array; and memory output logic, for formatting data streams output from the memory array into data packets for transmission to the requesting users. The system may further comprise input logic, for receiving and storing data in the memory array.

More specifically, the system further comprises command input logic, for receiving data stream control commands from the users, including means for updating the hardware interface table to effect the received commands. In one embodiment of the invention the command input logic includes means for receiving VCR-like (video-cassette-recorder-like) commands and the means for updating the hardware interface table includes means for changing a current memory address to effect a VCR-like command. In one embodiment of the invention, the system is capable of generating as many approximately 2,000 separate data streams simultaneously, each data stream being generated rapidly enough to supply continuous video information to the multiple users.

The invention may also be defined in terms of a method for generating multiple high-speed data streams from a solid state memory array. The method comprises the steps of receiving data requests from multiple users; storing, in a hardware interface table, a starting memory array address for each user request; generating a stream of memory array addresses for each user request, based in part on the starting memory array address stored in the hardware interface table; coupling the stream of memory addresses to the memory array; outputting a data stream from the memory array for each user request, in response to the stream of memory addresses; and formatting the output data for transmission to the user to satisfy the request.

More specifically, the step of coupling a stream of memory addresses includes coupling the starting memory array address and subsequently coupling other memory array addresses; and the step of generating a stream of memory array addresses includes updating the starting memory array address in the hardware interface table, after coupling the starting memory array address or other memory address to the memory array. The method may further comprise the steps of receiving a data stream control command from a user; storing the data stream control command in the hardware interface table; and modifying the memory array address in the hardware interface table, to effect the data stream control command, wherein the step of generating a stream of memory array addresses next generates an address determined by the modified memory array address in the table.

It will be appreciated from the foregoing that the present invention represents a significant advance in large high-speed mass storage systems. In particular, the data stream generator of the invention provides a large number of parallel data streams simultaneously, and rapidly enough for real-time video data applications. Other aspects and advantages of the invention will become apparent from the following more detailed description, taken in conjunction with the accompanying drawings, which are briefly described below.

DESCRIPTION OF THE PREFERRED EMBODIMENT

Figure 1:
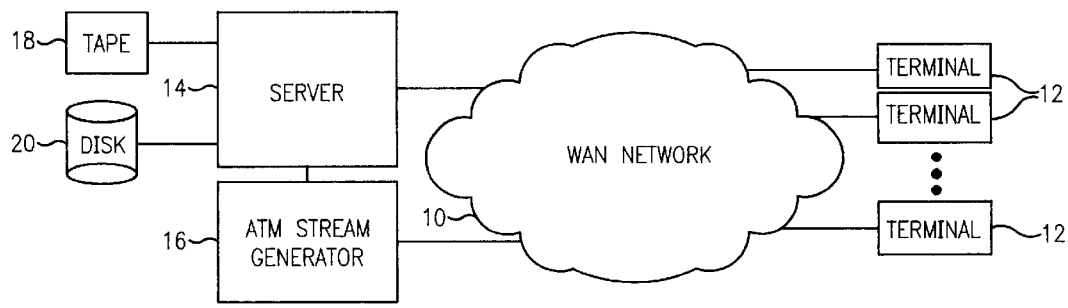
FIG. 1 is a block diagram showing the environment of the invention, including multiply user terminals coupled to the stream generator of the invention through a communication network.

As shown in the drawings for purposes of illustration, the present invention pertains to a high speed, solid state mass storage device capable of providing a large number of parallel data output streams on demand for multiple users. A representative application of the device is on-demand video for delivery to multiple users having television receivers. Each data stream has to be delivered at sufficient speed to allow the user to view the video data in real time, i.e., without any perceptible delays, and each stream has to be controllable in an interactive manner by the user, who may select commands analogous to those used in controlling a video cassette recorder (VCR). These VCR-like commands include "play," "stop," "fast-forward," and "rewind." In other applications of the invention, the user commands may take a different form but will still relate in some way to a desired sequencing of the data stream.

FIG. 1 shows a typical environment in which the invention may be used, including a communication network, indicated by the cloud 10, to which are connected multiple terminals 12 through which users communicate with the network. Also connected to the network is a server 14, which performs conventional user billing functions, as well as control functions with respect to other system components. The data stream generator of the invention is indicated as block 16 and is designated the ATM stream generator. The acronym ATM means "asynchronous transfer mode," which is a widely used standard for digital data transmission. The ATM standard defines the format of ATM packets of digital data. It will be understood, of course, that the present invention is not necessarily limited to the generation of data streams in ATM format. The system may also include conventional mass storage devices, such as magnetic tape 18 and disk 20, which are connected to the server 14 and may be used to generate data streams at a lower speed than the stream generator 16, or at a comparable speed but to fewer terminals 12.

Figure 2A:
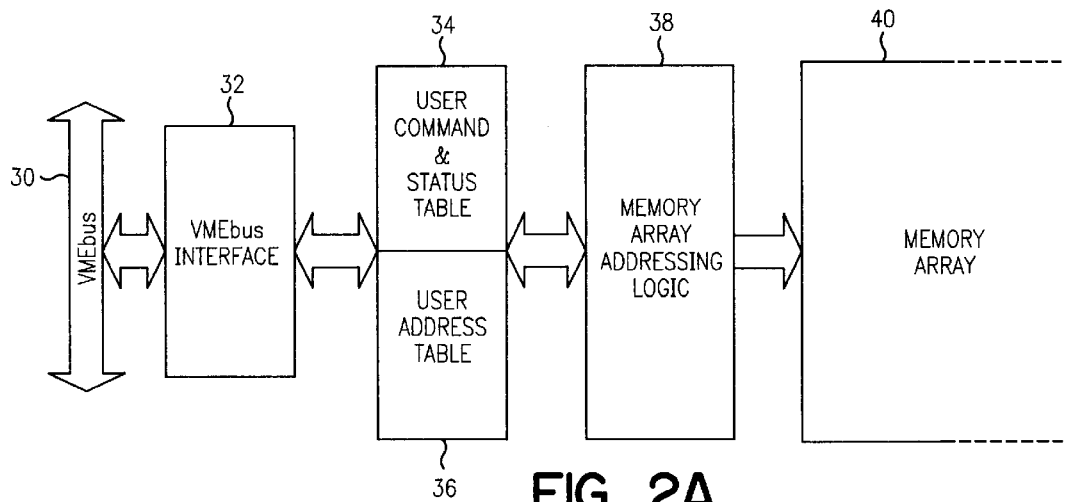
FIGS. 2A and 2B together are a block diagram of a data stream generator in accordance with the present invention.
Figure 2B:
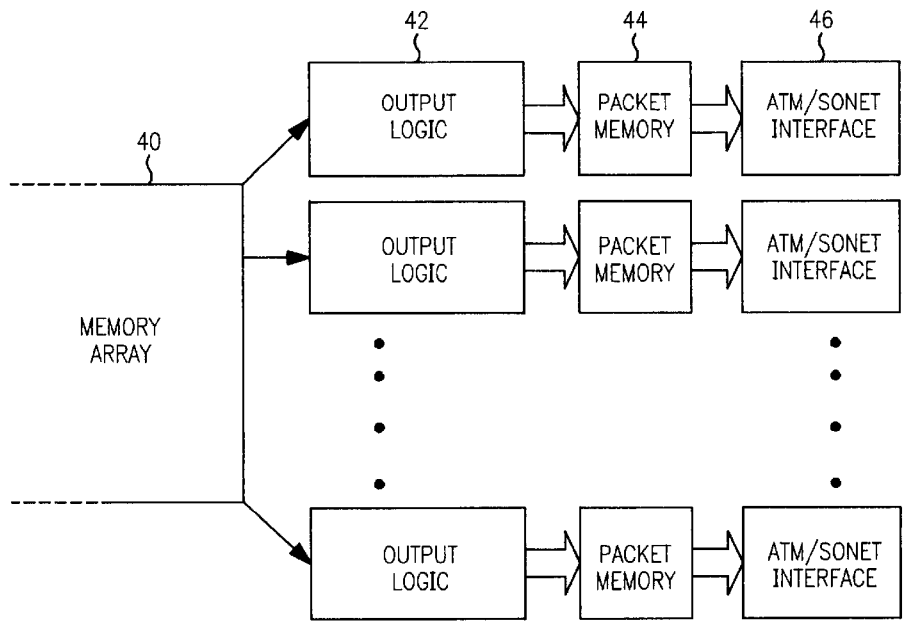

FIG. 2 is a block diagram of the ATM stream generator 16 of the invention. Communication between the various modules of the stream generator 16 and between the stream generator and the server 14, is by way of a VME bus 30. The VME (Versa Module Europa) bus is a well known open-ended bus system that makes use of the Eurocard standard. It has become a popular protocol in the computer industry is defined by the IEEE 1014-1987 standard. The stream generator 16 includes a VME bus interface 32, which communicates with a user command and status table 34 and a user address table 36. These tables, in turn, communicate with memory array addressing logic 38, which controls the generation of addresses for a large memory array 40. Output from the array 40 takes parallel paths through multiple output logic modules 42, packet memories 44 and ATM/SONET interface modules 46, the function of which is to format the data into packets in accordance with a widely used standard.

Figure 3A:
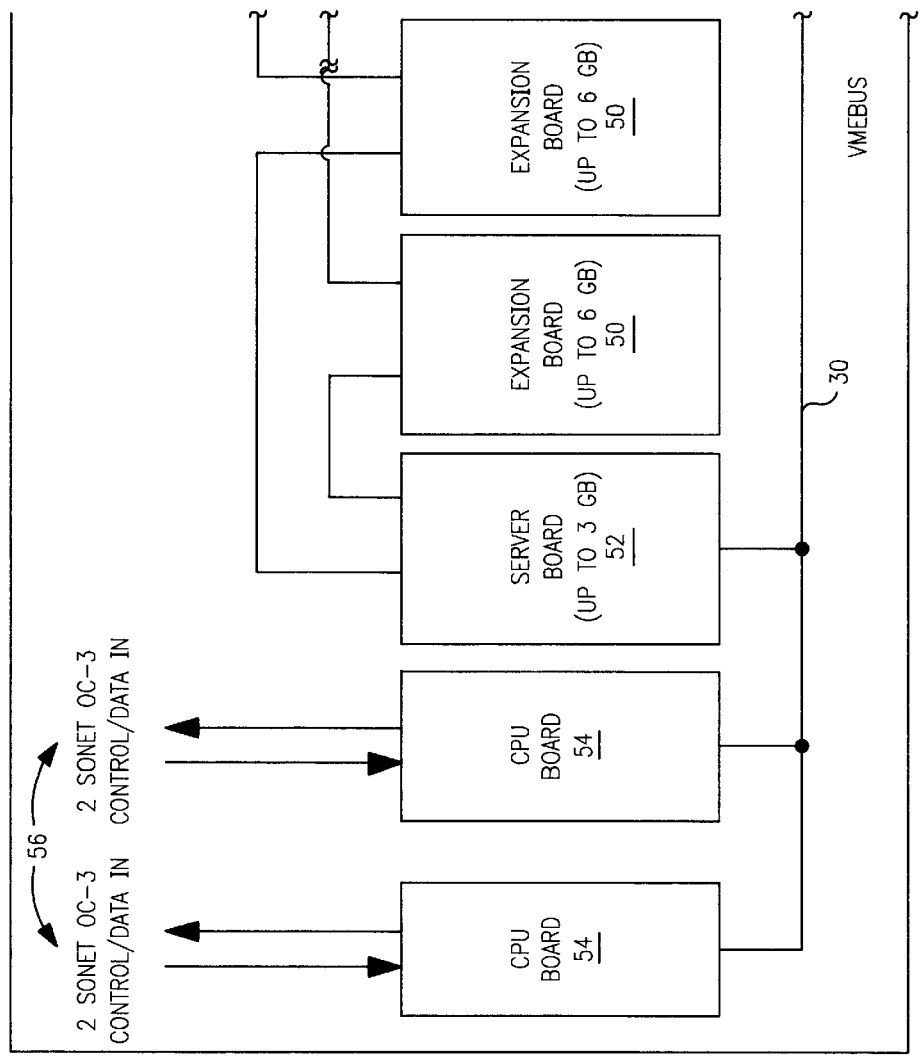
FIG. 3 is another block diagram of the data stream generator of the invention, drawn from a hardware perspective.
Figure 3B:
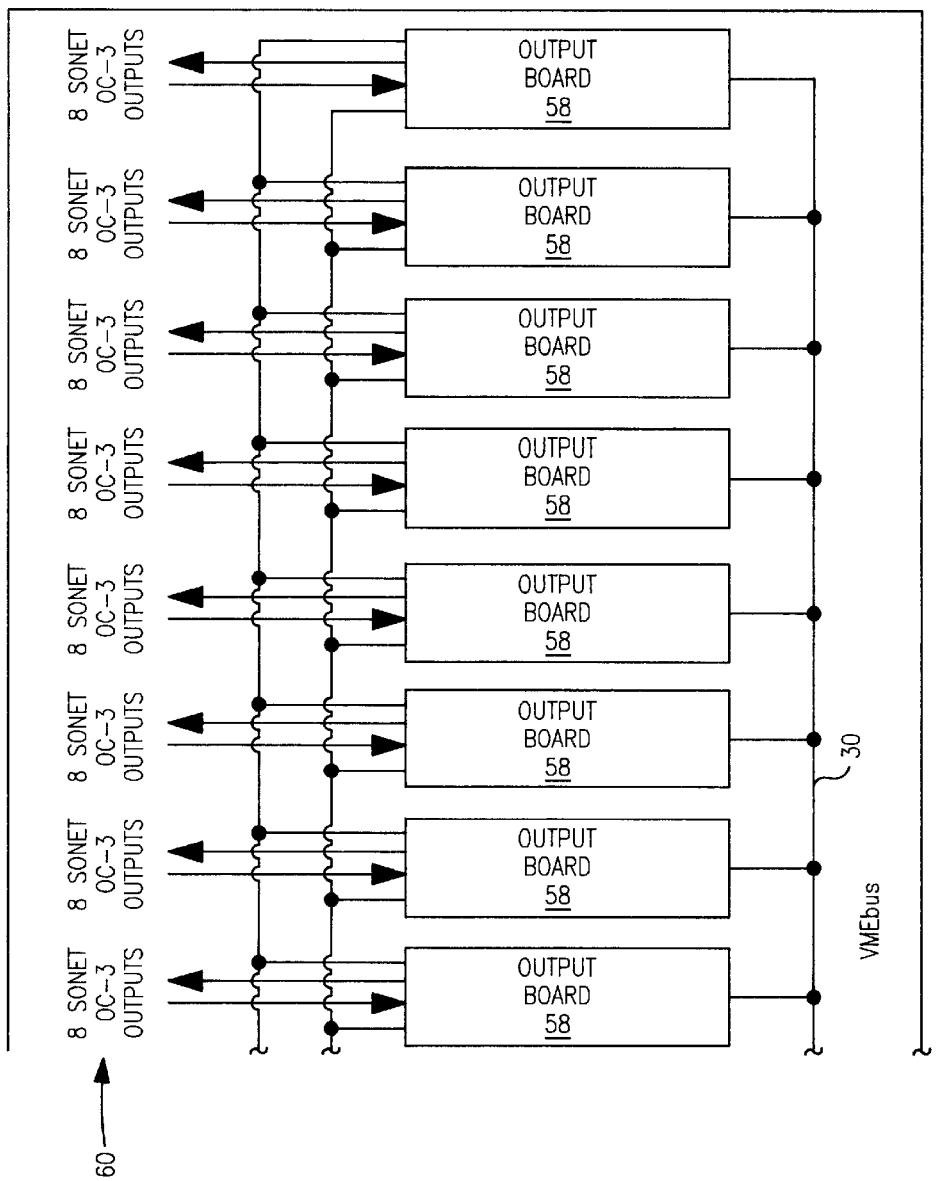

FIG. 3 is another block diagram of the stream generator 16, but one that is more hardware-oriented than the FIG. 2 diagram. FIG. 3 shows the VME bus 30 at the bottom of the figure, interconnecting all of the constituent modules except two expansion boards 50, which contain the memory array 40 of FIG. 2. Also shown in FIG. 2 are a server board 52, which contains the server 14 of FIG. 1, and two CPU (central processing unit) modules 54, which perform various control functions, including the control of data input through input ports 56. FIG. 2 further shows eight output boards 58, which contain the output logic 42, packet memory 44 and ATM/SONET interface 46 shown in FIG. 2. The output boards 58 are connected to corresponding output ports 60.

The stream generator performs both a data storing task and a data retrieval task. In the storing task, data are supplied through the input ports 56 (FIG. 3) and stored in the memory array 40 on the expansion boards 50. The input data may be derived from other mass storage media, such as the magnetic tape 18 or disk 20. In the case of video, the data may be already formatted in digital form, or the storing process may include digitizing, compressing and formatting the data. In any event, the data are stored in the memory array 40 for subsequent retrieval.

To initiate a data retrieval task, the stream generator 16 receives data retrieval requests from the server 14, the requests having originated from the user terminals 12. The location of the requested data must be determined and used to initialize the memory array addressing logic 38 and the user command and status table 34 and user address table 36. A critical aspect of the invention is that data retrieved from the memory array 40 are formatted into ATM data cells for direct output without passing through a processor. The memory array addressing logic 38 automatically generates a stream of memory addresses, under control of the state of the user command and status table 34. In particular, the user command, status and address tables 34 and 36 take the following form:

|  | Status | Command | Memory Address |
| --- | --- | --- | --- |
| User #1 | User #1 status | Last command (#1) | Current addr. (#1) |
| User #2 | User #2 status | Last command (#2) | Current addr. (#2) |
| . | . | . | . |
| . | . | . | . |
| . | . | . | . |
| User #n | User #n status | Last command (#n) | Current addr. (#n) |

The memory array addressing logic 38 automatically cycles through this table and generates a memory address for each active user. If the "last command" for a user is, for example "play," the logic 38 increments the current address for that user after each memory access, and thus generates a sequential stream of addresses for the user. The user status is continually updated by the stream generator. All of the table entries are conveniently addressable using the VME bus protocol, so it is a simple matter to change table entries to effect a particular control function originating from the user terminal 12. For example, if the last command for a user is "pause" or "stop," the logic 38 does not increment the current address for that user, but instead keeps generating the same address and hence the same block of data. This simplified description assumes that an addressable block of data corresponds to a video frame, which may or may not be the case. Other commands are similarly executed without the aid of an intervening processor. If the last command is "reverse," the logic 38 decrements the current address after each memory access. Similarly, "fast forward" is handled by skipping blocks of data in the forward direction. "Rewind"

is effected by simply resetting the current memory address to its starting point.

Using this hardware table as part of the interface between the server 14 and the memory array 40 allows the stream generator 16 to operate at extremely high speeds and data rates. For example, the stream generator 16 can operate at approximately 8,000 megabytes per second (Mbps) to support as many as 2,000 video data streams, each compressed to 4 Mbps using the MPEG-2 (motion picture group entertainment group, version 2) data compression format. These high speeds are achieved principally as a result of using this hardware table interface to generate the address streams. Each address stream generates a corresponding data stream originating in the memory array 40 and transmitted through the output logic 42 to the packet memory 44. The packet memory 44 functions as a small buffer memory, holding data packets as they are being segmented into ATM cells.

More specifically, the packet memory 44 is large enough to hold two data packets for each user. Each output logic block 42 tracks the data segmentation process for each user at the output. When a packet has been completely segmented, the output logic requests a new data packet from the memory array addressing logic 38. Thus, there will be continuous supply of data at the output, ensuring a constant output data rate to the user.

When the memory array addressing logic 38 receives a data packet request, it first checks the command and status table 34 entry for the user requesting the data. If the user stream is not active, e.g., because the last command is "stop," the logic 38 ignores the request. If the user is active, the current address is retrieved from the table, used in a memory access operation, and then either incremented, decremented, or left unchanged, before being written back into the table.

Figure 4:
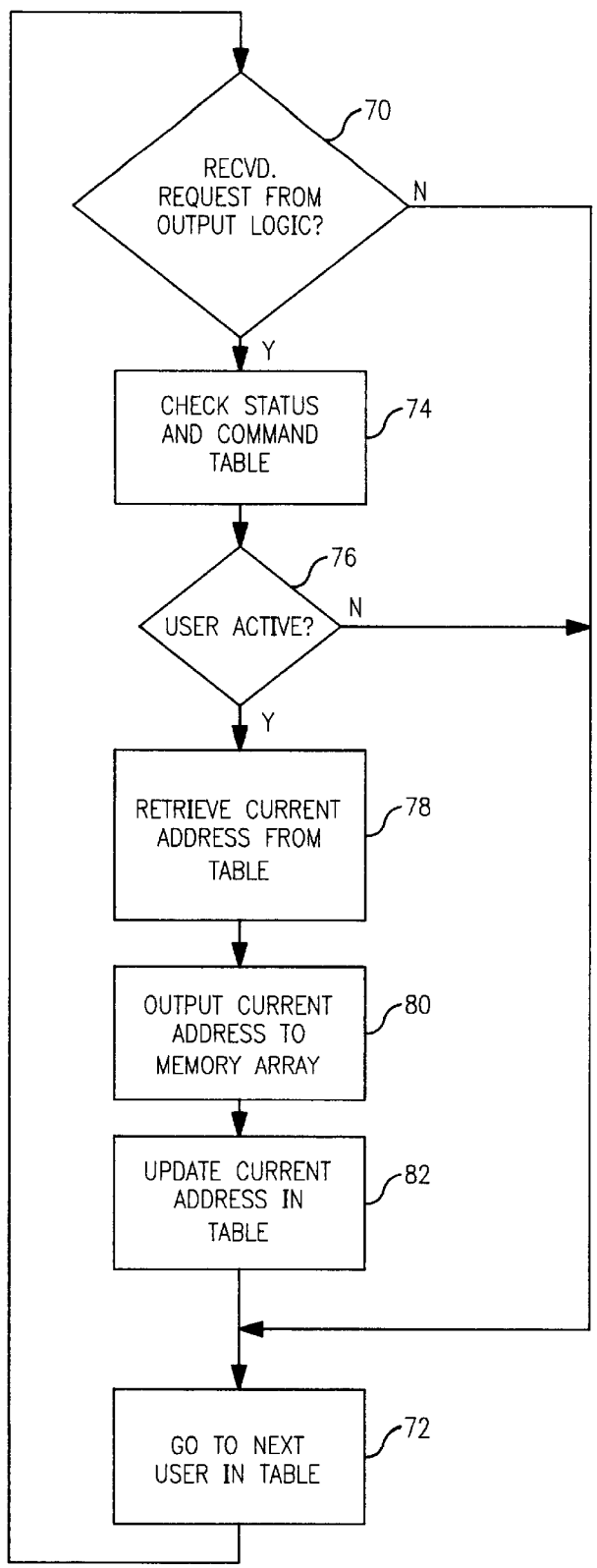
FIG. 4 is a flowchart showing the functions performed by memory array addressing logic that is a critical part of the stream generator of FIG. 2.

The functions performed by the memory array addressing logic 38 are shown in flowchart form in FIG. 4. These functions are performed in hardware in which the logic 38 is implemented. As indicated in decision block 70, the logic 38 checks to determine if a data request has been returned from the output logic 42. As explained above, the output logic 42 controls output flow through a packet memory 44, and only requests more data when there is enough room to receive it in the packet memory. If the output logic 42 is unable to accept data, the memory array addressing logic 38 considers the next user, as indicated in block 72. If the output logic 42 is ready to receive data, the memory array addressing logic 38 next checks the user command and status table 34, as indicated in block 74. If the current user is inactive, e.g. in a "stop" mode, as determined in decision block 76, no address generation is performed and the logic considers the next user, as indicated in block 72. For an active user, the next step is to retrieve the current memory address from the user address table 36, as indicated in block 78. This output address is sent to the memory array 40, which begins to output an appropriate block of memory. Finally, the memory array addressing logic updates the current address in the table 36, as indicated in block 82, consistent with the last command issued by the user. For example, in the normal "play" mode, the current address is simply incremented. The memory array addressing logic 38 continues cycling through the other users in the system, as indicated in block 72, generating a stream of memory addresses for each active user.

It will be appreciated from the foregoing that the present invention represents a significant advance in the field of mass storage devices for on-demand high speed retrieval of data by large numbers of users. Use of hardware for the memory array addressing logic provides for high speed generation of output data packets without an intervening processor. In an appropriate configuration, the stream generator of the invention can generate as many as 2,000 user-controllable data streams simultaneously, at a data rate high enough to supply motion picture video signals to the users in real time. It will also be appreciated that, although a specific embodiment of the invention has been described in detail for purposes of illustration, various modifications may be made without departing from the spirit and scope of the invention.

What is claimed is:

1. A high speed solid state mass storage system for supplying multiple controllable data streams to separate users, the system comprising the following components located at a central server site:

a server for receiving and processing data requests from multiple users;

a solid state addressable memory array, for storing data for retrieval by multiple separate users;

a hardware interface table coupled to the server and defining selectable user status, user command and current memory address information for each user accessing the memory array;

memory array addressing logic coupled to the hardware interface table and to the solid state addressable memory array, for generating a stream of memory addresses based on information stored in the hardware interface table, wherein the stream of memory addresses results in generation of a corresponding stream of data from the memory array; and memory output logic, for formatting data streams output from the memory array into data packets for transmission to the requesting users.

2. A system as defined in claim 1, and further comprising:

input logic, also located at the central server site, for receiving and storing data in the memory array.

3. A system as defined in claim 1, and further comprising:

command input logic, also located at the central server site, for receiving data stream control commands from the users, including means for updating the hardware interface table to effect the received commands.

4. A system as defined in claim 3, wherein the command input logic includes means for receiving VCR-like (video-cassette-recorder-like) commands and the means for updating the hardware interface table includes means for changing a current memory address to effect a VCR-like command.

5. A system as defined in claim 1, wherein:

the system is capable of generating as many as approximately 2,000 separate data streams simultaneously, each data stream being generated rapidly enough to supply continuous video information to the multiple users.

6. A method for generating multiple high-speed data streams from a solid state memory array located at a central server site, the method comprising the steps of:

receiving at the central server site data requests from multiple users located at remote sites;

storing, in a hardware interface table also located at the central server site, a starting memory array address for each user request;

generating a stream of memory array addresses for each user request, based in part on the starting memory array address stored in the hardware interface table;

coupling the stream of memory addresses to the memory array;

outputting a data stream from the memory array for each user request, in response to the stream of memory addresses; and formatting the output data for transmission to the user to satisfy the request.

7. A method as defined in claim 6, wherein:

the step of coupling a stream of memory addresses includes coupling the starting memory array address and subsequently coupling other memory addresses; and the step of generating a stream of memory array addresses includes updating the starting memory array address in the hardware interface table, after coupling the starting memory array address or other memory address to the memory array.

8. A method as defined in claim 7, and further comprising:

receiving a data stream control command from a user;

storing the data stream control command in the hardware interface table; and modifying the memory array address in the hardware interface table, to effect the data stream control command, wherein the step of generating a stream of memory array addresses next generates an address determined by the modified memory array address in the table.

* * * * *